United States Patent
Kato et al.

(10) Patent No.: US 11,246,309 B2
(45) Date of Patent: Feb. 15, 2022

(54) PRESERVING AGENT FOR ORGANS OR TISSUE AND PRESERVATION METHOD FOR ORGANS OR TISSUE

(71) Applicant: ISHIHARA SANGYO KAISHA, LTD., Osaka (JP)

(72) Inventors: Fuminori Kato, Osaka (JP); Shuichi Yotsuya, Osaka (JP)

(73) Assignee: ISHIHARA SANGYO KAISHA, LTD., Osaka (JP)

( * ) Notice: Subject to any disclaimer, the term of this patent is extended or adjusted under 35 U.S.C. 154(b) by 378 days.

(21) Appl. No.: 15/754,422

(22) PCT Filed: Aug. 30, 2016

(86) PCT No.: PCT/JP2016/075297
§ 371 (c)(1),
(2) Date: Feb. 22, 2018

(87) PCT Pub. No.: WO2017/038805
PCT Pub. Date: Mar. 9, 2017

(65) Prior Publication Data
US 2018/0242571 A1 Aug. 30, 2018

(30) Foreign Application Priority Data

Aug. 31, 2015 (JP) ............................. JP2015-171012
May 9, 2016 (JP) ............................. JP2016-093546

(51) Int. Cl.
*A01N 1/02* (2006.01)

(52) U.S. Cl.
CPC ............. *A01N 1/0226* (2013.01); *A01N 1/02* (2013.01)

(58) Field of Classification Search
None
See application file for complete search history.

(56) References Cited

U.S. PATENT DOCUMENTS

| | | | |
|---|---|---|---|
| 6,528,042 B1 * | 3/2003 | Brown | A61K 8/44 424/401 |
| 2003/0022148 A1 | 1/2003 | Seki | |
| 2007/0178434 A1 | 8/2007 | Natan et al. | |
| 2007/0277535 A1 | 12/2007 | Uri et al. | |
| 2008/0038818 A1 | 2/2008 | Natan et al. | |
| 2010/0150895 A1 | 6/2010 | Mazzio et al. | |
| 2010/0197017 A1 | 8/2010 | Natan et al. | |
| 2011/0177488 A1 | 7/2011 | Natan et al. | |
| 2013/0059380 A1 * | 3/2013 | Ho | A01N 1/021 435/374 |

FOREIGN PATENT DOCUMENTS

| | | |
|---|---|---|
| CN | 1505474 A | 6/2004 |
| CN | 102578078 A | 7/2012 |
| CN | 103478118 A | 1/2014 |
| JP | 2002-335954 A | 11/2002 |
| JP | 2003-524427 A | 8/2003 |
| JP | 2003-267801 A | 9/2003 |
| JP | 2006-188436 A | 7/2006 |
| JP | 2007-519712 A | 7/2007 |
| JP | 2009-221128 A | 10/2009 |
| WO | 01/64041 A1 | 9/2001 |
| WO | 2002/001952 A1 | 1/2002 |
| WO | 2013/047665 A1 | 4/2013 |
| WO | 2013/047666 A1 | 4/2013 |
| WO | 2014/162910 A1 | 10/2014 |

OTHER PUBLICATIONS

Southard, J. H., et al. "Important components of the UW solution." Transplantation 49.2 (1990): 251-257 (Year: 1990).*
Office Action issued in IN Patent App. No. 201817010630, dated Mar. 3, 2020.
International Search Report issued in PCT/JP2016/075297, dated Nov. 15, 2016.
International Preliminary Report on Patentability issued in PCT/JP2016/075297, dated Mar. 6, 2018.
Kidney International, Nature Publishing Group, London, GB, vol. 63, No. 2, Feb. 1, 2003, pp. 554-563.
Transplantation Proceedings, vol. 36, No. 5, Jun. 1, 2004, pp. 1261-1264.
Transplant International., vol. 25, No. 6, Apr. 4, 2012, pp. 696-706.
Extended European search report dated Apr. 25, 2019 for EP patent application No. 16841837.4.
Drury et al. "Morphological Assessment of Sucrose Preservation for Porcine Heart Valves" *Thorax*, vol. 37, pp. 466-471 (1982).
Changani et al. "Bioenergetic Targeting during Organ Preservation: $^{31}$P Magnetic Resonance Spectroscopy Investigations into the Use of Fructose to Sustaining Hepatic ATP Turnover during Cold Hypoxia in Porcine Livers" *Cryobiology*, vol. 41, pp. 72-87 (2000).
Office Action issued in JP Patent Application No. 2017-538040, dated May 26, 2020, along with an English-language translation.

* cited by examiner

*Primary Examiner* — Emily A Cordas
(74) *Attorney, Agent, or Firm* — Greenblum & Bernstein, P.L.C.

(57) ABSTRACT

This invention discloses a preserving agent for organs or tissue comprising (A) quercetin, and (B) at least one sugar selected from the group consisting of fructose and sucrose; a preserving solution for organs or tissue comprising the preserving agent; and a preservation method for organs or tissue comprising the step of immersing an organ or tissue in a liquid mixture comprising (A) quercetin, and (B) at least one sugar selected from the group consisting of fructose and sucrose.

8 Claims, No Drawings

PRESERVING AGENT FOR ORGANS OR TISSUE AND PRESERVATION METHOD FOR ORGANS OR TISSUE

TECHNICAL FIELD

The present invention relates to a preserving agent for organs or tissue, a preserving solution for organs or tissue comprising the preserving agent, and a preservation method for organs or tissue.

BACKGROUND ART

A cell has different ion compositions inside and outside thereof as separated by the cell membrane, and the resulting distribution difference of charged ions brings a difference in potential. Generally, the interior of a cell has a negative potential (membrane potential) with respect to the exterior of the cell, and all animals and plants have this membrane potential as the basic principle common to living organisms. The membrane potential regulation mechanism is indispensable in maintaining life and exerting cell functions, and its failure directly leads to the termination of life or cell death.

For this reason, various ion pumps and ion channels are present in the interior and exterior cell membrane and constantly regulate the ion balance. Sodium pump ($Na^+$-$K^+$ ATPase) is the most important ion balance regulatory mechanism in animal cells, and proton pump ($H^+$-ATPase) is the most important ion balance regulatory mechanism in plant cells. These ion pumps are membrane proteins that perform active transport of specific ions using ATP energy. If ATP is depleted due to some cause or as the ambient temperature deviates from the optimum range, the function of ion pump will decrease or stop.

In an animal cell under physiological conditions, three sodium ions are pumped out from the cell at one time mainly by the action of the sodium pump, and, conversely, two potassium ions are pumped into the cell from the outside of the cell. Therefore, generally, the inside of the cell has a high potassium concentration (a low sodium concentration), and the outside of the cell has a high sodium concentration (a low potassium concentration). The function of the sodium pump in a cell decreases if the temperature falls below a certain level; consequently, sodium cannot be pumped outside the cell, and the sodium concentration in the cell increases. As the sodium concentration increases, the intracellular osmotic pressure also increases; as a result, the cell is swollen due to an inflow of water molecules, and eventually undergoes cell rupture (cell damage).

The aforementioned mechanism is considered to be one of the main causes of cell damage when an organ or tissue is preserved at a low temperature for the purpose of organ transplantation or tissue transplantation at a medical site. Therefore, a preserving solution for organs or tissue whose basic electrolyte composition is an intracellular-type composition with a low sodium concentration and a high potassium concentration has been developed. Typical examples of such preserving solutions include the Euro-Collins (EC) solution and UW (University of Wisconsin) solution. Compared with the previously known extracellular-type (high sodium concentration, low potassium concentration) preserving solutions, such as Ringer's solution, these preserving solutions are capable of greatly extending the period of preservation of organs or tissue for transplantation; thus, these preserving solutions have been clinically used as major preserving solutions for organs or tissue for transplantation both in Japan and other countries. However, on the other hand, these intracellular-type preserving solutions pose a risk of causing cytotoxicity when the preservation temperature is increased. In addition, these preserving solutions cannot be applied to all organs or tissue for transplantation. Thus, further improvement in the performance of the preserving solutions, including further extension of the preservation period, has been expected.

For example, Patent Documents 1 to 8 detailed below disclose techniques for preserving organs or tissue.

Patent Document 1 discloses a method for preserving biological materials, comprising adding a preserving solution comprising one or more polyphenols to a biological material, and cooling the biological material. The Examples of Patent Document 1 merely disclose catechins as examples of polyphenol. Further, although Patent Document 1 discloses, as cryoprotectants, sugars, such as sucrose, glucose, trehalose, and the like, only trehalose is actually used in the Examples of Patent Document 1.

Patent Document 2 discloses a method of cell preservation through refrigeration at a temperature in which water is not crystallized, for example, about 4° C., comprising adding an enkephalin derivative to the cell culture solution. However, Patent Document 2 nowhere discloses sugars.

Patent Document 3 discloses a medical polyphenol solution for use in a cell preserving agent, a tissue preserving agent, or the like, comprising polyphenol, 0.0001 to 0.05 wt % of ascorbic acid or a metal ascorbate. This medical polyphenol solution is capable of inhibiting the decomposition of polyphenol, thereby inhibiting the generation of hydrogen peroxide. However, only epigallocatechin gallate (EGCg) is used as a polyphenol in the Examples of Patent Document 3. Further, although Patent Document 3 discloses monosaccharide, disaccharide, and polysaccharide compounds (including glucose, mannose, and dextrin) as optional additives; the Examples of Patent Document 3 nowhere discloses sugars.

Patent Document 4 discloses a preservative composition containing, as an active ingredient, 90 mass % or more of epigallocatechin gallate, and discloses that the preservative composition containing epigallocatechin gallate that is refined to a high purity ensures more constant cell preservation effects. Although the Examples of Patent Document 4 disclose the use of glucose in the preservation of pancreatic islets at 37° C., Patent Document 4 nowhere discloses fructose or sucrose, which are sugars used in the present invention.

Patent Documents 5 and 6 disclose that flavonoid glycoside and flavonoid non-glycoside compounds have protective effects against low-temperature damage. Further, Patent Document 7 discloses that the low-temperature damage protection effects can be further enhanced by using flavonoid glycoside and flavonoid non-glycoside in combination.

Patent Document 8 discloses that a preserving fluid for cells and tissue comprising polyphenol as an active ingredient and optionally trehalose has a protective action with respect to cells, organs, and tissue. The Examples of Patent Document 8 merely disclose a combined use of trehalose and catechin as polyphenol.

CITATION LIST

Patent Documents

Patent Document 1: JP2007-519712A
Patent Document 2: JP2002-335954A
Patent Document 3: JP2006-188436A Patent Document 4: JP2003-267801A
Patent Document 5: WO2013/047665
Patent Document 6: WO2013/047666
Patent Document 7: WO2014/162910
Patent Document 8: WO02/001952

SUMMARY OF INVENTION

Technical Problem

Patent Documents 1 to 8 nowhere substantially disclose the combined use of quercetin and specific sugars of the present invention for a preserving solution for organs or tissue.

A method for preserving cells, tissue, body parts, organs, and the like simply at a low temperature has been commonly performed. However, it has been known that the low-temperature conditions cause damage even when the preservation does not involve freezing of the target object. Previously known preservation techniques were incapable of preserving all kinds of cells, tissue, body parts, or organs. Thus, further improvement in performance, including further extension of the preservation period, has been long awaited.

The present invention was made to solve such problems of low-temperature damage and the like, and an object of the invention is to provide a preserving agent for organs or tissue, a preserving solution for organs or tissue comprising the preserving agent, and a preservation method for organs or tissue.

Solution to Problem

The present inventors found that it is possible to obtain a protective effect against low-temperature damage by using a combination of quercetin and specific sugars, and preserving the cells under a temperature ranging from a non-freezing low temperature to a general refrigeration temperature. The present invention was made based on this finding, and provides the following preserving agent, preserving solution, and preservation method.
(I) Preserving Agent
(I-1) A preserving agent for organs or tissue, comprising (A) quercetin; and (B) at least one sugar selected from the group consisting of fructose and sucrose.
(I-2) The preserving agent according to Item (I-1), wherein the organ or tissue is heart, liver, kidney, pancreas, or pancreatic islet.
(I-3) The preserving agent according to Item (I-1) or (I-2), wherein the preserving agent is used for low-temperature preservation.
(I-4) A low-temperature damage protection agent for organs or tissue, comprising (A) quercetin; and (B) at least one sugar selected from the group consisting of fructose and sucrose.
(II) Preserving Solution
(II-1) A preserving solution for organs or tissue, comprising the preserving agent of any one of Items (I-1) to (I-3).
(II-2) The preserving solution according to Item (II-1), wherein the preserving solution is used for low-temperature preservation.
(III) Preserving Method
(III-1) A preservation method for organs or tissue, comprising the step of immersing an organ or tissue in a liquid mixture comprising (A) quercetin; and (B) at least one sugar selected from the group consisting of fructose and sucrose.
(III-2) The method according to Item (III-1), wherein the organ or tissue is heart, liver, kidney, pancreas, or pancreatic islet.
(III-3) The method according to Item (III-1) or (III-2), wherein the liquid mixture is kept at a low temperature in the immersing step.

Advantageous Effects of Invention

The preserving agent and the preservation method of the present invention provide a low-temperature damage protection effect with respect to organs or tissue. Therefore, the present invention is suitable for the preservation of organs or tissue, and enables organs or tissue to be preserved for a long period of time at conditions inhibiting low-temperature damage.

Therefore, the present invention is expected to be applied in the fields of organ transplants, tissue transplants, and the like.

DESCRIPTION OF EMBODIMENTS

The present invention is specifically explained below.

The preserving agent for organs or tissue of the present invention is characterized by comprising (A) quercetin; and (B) at least one sugar selected from the group consisting of fructose and sucrose.

Further, the preservation method for organs or tissue of the present invention is characterized by comprising the step of immersing an organ or tissue in a liquid mixture comprising (A) quercetin; and (B) at least one sugar selected from the group consisting of fructose and sucrose.

The quercetin and sugars used in the present invention may be chemically synthesized by a known method. Further, since quercetin and sugars are contained in organisms such as plants, they may be obtained by being extracted from such an organism using a known method. Further, quercetin and sugars may be obtained from commercial suppliers.

The "low-temperature damage" in the present specification means cell damage caused by a low temperature, and "a low-temperature damage protection effect" means an effect to protect cells from such a low-temperature damage. Therefore, in light of these meanings, the preserving agent of the present invention may be referred to as a "low-temperature damage protection agent."

In the present invention, the organ or tissue may be derived from any animal. Among various animals, organs or tissue derived from a mammal (humans, apes, bovine, swine, sheep, goats, horses, dogs, cats, rabbits, mice, rats, or the like) are preferable.

The organ or tissue is preferably applied to organ transplantation or tissue transplantation. Examples of organs include heart, lung, liver, kidney, pancreas, and small intestine; preferable examples include heart, liver, kidney and pancreas; and particularly preferable examples include heart and liver. Examples of tissue include cornea, skin, bones, blood vessels, heart valves, amniotic membranes, pancreatic islets, and the like; preferable examples include pancreatic islets.

In addition to quercetin and at least one sugar selected from the group consisting of fructose and sucrose, known additives may be suitably incorporated in the preserving agent of the present invention.

The preserving solution for organs or tissue of the present invention is characterized by comprising the preserving agent described above. In the preservation of organs or tissue in the present invention, quercetin and at least one sugar selected from the group consisting of fructose and sucrose are used in the form of a liquid mixture (i.e., fluid mixture, preferably a solution) (corresponding to the preserving solution in this specification). The liquid mixture generally contains a solvent in addition to quercetin and at least one sugar selected from the group consisting of fructose and sucrose. The solvent is not particularly limited, and examples thereof include a physiological saline solution, infusions (electrolyte infusion, nutrient infusion, carbohydrate infusion, amino acid infusion, glucose solution, Ringer's solution, Ringer's acetate solution, Ringer's lactate solution, etc.), a buffer solution (PBS, Tris-buffer solution, Hepes buffer solution, MOPS buffer solution, PIPES buffer solution, etc.), a cell culture solution (RPMI 1640, DMEM etc.), organ or tissue preserving solution (EC solution, UW solution, ET-Kyoto solution, etc.), a modena solution, etc.

The quercetin concentration in the preserving solution of the present invention is generally 0.001 to 1000 μg/mL, preferably 0.01 to 100 μg/mL. The sugar concentration in the preserving solution of the present invention is generally 0.01 to 0.8M, and preferably 0.025 to 0.4M (when the preserving solution contains both fructose and sucrose, the sugar concentration means the total concentration thereof). The preserving solution of the present invention may contain other previously known components, such as antibiotics, antibacterial agents, antioxidants, serums, sugars, lipids, vitamins, proteins, peptides, amino acids, pH indicators, chelating agents, osmotic pressure regulators, and the like.

The present invention is preferably carried out at a temperature (low temperature) at which organs or tissue does not freeze. The temperature at which organs or tissue does not freeze cannot be unconditionally defined as it varies depending on the components contained in the preserving agent or preserving solution, the composition, the preservation period, the organs or tissue to be preserved, and the like. From the viewpoint of exhibiting the low-temperature damage protection effect of the present invention, for example, the temperature is −15° C. to 20° C., preferably 0° C. to 20° C., and more preferably 0° C. to 10° C.

When cooling the organs or tissue, the liquid mixture may be cooled in advance before the organs or tissue is immersed therein, or after the organs or tissue is immersed therein, insofar as the organs or tissue does not freeze. Further, once the liquid mixture containing an organ or tissue is cooled, the liquid mixture is maintained at the same temperature insofar as the organ or tissue does not freeze. However, it is not necessary to keep it at a constant temperature at all times; it is acceptable that the temperature may fall out of the above range only for a short period of time.

By using a liquid mixture containing quercetin and at least one sugar selected from the group consisting of fructose and sucrose of the present invention, a low-temperature damage protection effect can be ensured. Since the present invention allows organs or tissue to be preserved under conditions suitable for preservation while inhibiting low-temperature damage derived from such conditions, the present invention enables preservation of organs or tissue under appropriate conditions.

EXAMPLES

The present invention is more specifically explained below in reference to Examples. However, the present invention is not limited to these examples etc.

Test Example 1: Effects of Combined Use of Quercetin and Sugar in an Organ Preservation Test The protective action of a preserving solution for organs or tissue used in organ transplantation or tissue transplantation was assumed, and formulations of preservative solutions containing UW solution, and a combination of quercetin and sugar were evaluated using liver damage degree as an index.

Williams solution (GIBCO, No. 12551-032) only, Williams solution containing quercetin (Sigma-Aldrich, 337951-25G) (10 μg/mL), Williams solution containing quercetin (10 μg/mL) and fructose (0.05M to 0.4M) (Kanto Chemical Co., Inc., Code No. 16065-00) (0.05M to 0.4M), or Williams solution containing quercetin (10 μg/mL) and sucrose (0.025M to 0.2M) (Nacalai Tesque, Inc., Code No. 30404-45) (0.025M to 0.2M) was used as an organ perfusion solution. Subsequently, UW solution (VSP1000, VIASPAN (cold storage solution) 1000 mL: Astellas Pharma Inc.) only, UW solution containing quercetin (10 μg/mL), UW solution containing quercetin (10 μg/mL) and fructose (0.05M to 0.4M), or UW solution containing quercetin (10 μg/mL) and sucrose (0.025M to 0.2M) was used as an organ preserving solution.

SD rats (male, body weight=255.4 g to 339.0 g) were injected with heparin from the portal vein under anesthesia. Thereafter, they were perfused with a physiological saline solution (8 cmH$_2$O, about 100 mL) at room temperature, and then perfused with each organ perfusion solution (8 cmH$_2$O, about 100 mL) at room temperature. Thereafter, the liver was excised, immersed in 20 mL of each organ preserving solution, and preserved at 4° C. A part of each organ preserving solution was collected at 1 day after, 3 days after, 5 days after, and 7 days after the preservation was started, and ALT (alanine aminotransferase) (IU/L) was measured as an index of the degree of liver damage due to low-temperature preservation. The measured ALT are shown in Tables 1 and 2 (average value of n=3±standard deviation).

TABLE 1

Effects of Combined Use of Quercetin and Sugar (Liver Preservation Effects)

| Concentration in Addition | | ALT Value in Organ Immersion Solution (IU/L) | | | |
| --- | --- | --- | --- | --- | --- |
| Quercetin | Sugar | 1 day after | 3 days after | 5 days after | 7 days after |
| (1) — | — | 292 ± 100 | 404 ± 172 | 416 ± 166 | 440 ± 172 |
| (2) 10 μg/mL | — | 65 ± 71 | 90 ± 82 | 98 ± 77 | 117 ± 71 |
| (3) 10 μg/mL | 0.05M Fructose | 18 ± 8 | 37 ± 13 | 55 ± 3 | 83 ± 13 |
| (4) 10 μg/mL | 0.1M Fructose | 30 ± 21 | 57 ± 23 | 84 ± 52 | 128 ± 93 |
| (5) 10 μg/mL | 0.2M Fructose | 24 ± 8 | 49 ± 13 | 59 ± 12 | 92 ± 15 |
| (6) 10 μg/mL | 0.4M Fructose | 21 ± 8 | 43 ± 16 | 53 ± 14 | 72 ± 10 |

TABLE 2

Effects of Combined Use of Quercetin and Sugar (Liver Preservation Effects)

| Concentration in Addition | | ALT Value in Organ Immersion Solution (IU/L) | | | |
|---|---|---|---|---|---|
| Quercetin | Sugar | 1 day after | 3 days after | 5 days after | 7 days after |
| (1) — | — | 399 ± 125 | 577 ± 207 | 583 ± 211 | 616 ± 215 |
| (2) 10 μg/mL | — | 62 ± 68 | 108 ± 121 | 126 ± 135 | 148 ± 144 |
| (3) 10 μg/mL | 0.025M Sucrose | 18 ± 16 | 35 ± 33 | 58 ± 64 | 79 ± 72 |
| (4) 10 μg/mL | 0.05M Sucrose | 28 ± 5 | 53 ± 12 | 62 ± 15 | 84 ± 21 |
| (5) 10 μg/mL | 0.1M Sucrose | 21 ± 15 | 40 ± 35 | 52 ± 44 | 82 ± 74 |
| (6) 10 μg/mL | 0.2M Sucrose | 34 ± 21 | 55 ± 22 | 77 ± 20 | 134 ± 56 |

The ALT in the preservation in the UW solution containing quercetin and trehalose was greater than the ALT in the preservation in the UW solution containing quercetin and fructose or in the UW solution containing quercetin and sucrose.

Test Example 2: Effects of Combined Use of Quercetin and Sugar in an Organ Preservation Test The same test as in Test Example 1 was performed using heart instead of liver, and the formulations of preservative solutions containing UW solution, and a combination of quercetin and sugar were evaluated using heart damage degree as an index.

Williams solution only, Williams solution containing quercetin (10 μg/mL) and fructose (0.2M), or Williams solution containing quercetin (10 μg/mL) and sucrose (0.1M) was used as an organ perfusion solution. Subsequently, UW solution only, UW solution containing quercetin (10 μg/mL) and fructose (0.2M), or UW solution containing quercetin (10 μg/mL) and sucrose (0.1M) was used as an organ preserving solution.

SD rats (male, body weight=257.4 g to 280.3 g) were injected with heparin from the large vein under the suprahepatic portion under anesthesia. Thereafter, they were perfused with a physiological saline solution (8 cmH₂O, about 100 mL) at room temperature, and then perfused with each organ perfusion solution (8 cmH₂O, about 100 mL) at room temperature. Thereafter, the heart was excised, immersed in 20 mL of each organ preserving solution, and preserved at 4° C. A part of each organ preserving solution was collected at 1 day after, 2 days after, 3 days after, and 4 days after the preservation was started, and LDH (lactase dehydrogenase) (IU/L) was measured as an index of the degree of heart damage due to low-temperature preservation. The measured LDH are shown in Table 3 (average value of n=3±standard deviation).

TABLE 3

Effects of Combined Use of Quercetin and Sugar (Heart Preservation Effects)

| Concentration in Addition | | LDH Value in Organ Immersion Solution (IU/L) | | | |
|---|---|---|---|---|---|
| Quercetin | Sugar | 1 day after | 2 days after | 3 days after | 4 days after |
| (1) — | — | 213 ± 54 | 312 ± 71 | 403 ± 83 | 528 ± 113 |
| (2) 10 μg/mL | 0.2M Fructose | 134 ± 56 | 190 ± 76 | 238 ± 78 | 287 ± 81 |
| (3) 10 μg/mL | 0.1M Sucrose | 116 ± 15 | 172 ± 12 | 248 ± 40 | 319 ± 40 |

Test Example 3: Effects of Combined Use of Quercetin and Sugar in an Organ or Tissue Preservation Test, Histopathological Change The formulations of preserving solutions containing UW solution, and a combination of quercetin and sugar were evaluated using a hepatic histopathological change as an index.

Williams solution only, Williams solution containing only quercetin (10 μg/mL), Williams solution containing only fructose (0.2M), Williams solution containing only sucrose (0.1M), Williams solution containing quercetin (10 μg/mL) and fructose (0.2M), or Williams solution containing quercetin (10 μg/mL) and sucrose (0.1M) was used as an organ perfusion solution. Subsequently, as an organ preserving solution, UW solution only, UW solution containing only quercetin (10 μg/mL), UW solution containing only fructose (0.2M), UW solution containing only sucrose (0.1M), UW solution containing quercetin (10 μg/mL) and fructose (0.2M) or UW solution containing quercetin (10 μg/mL) and sucrose (0.1M) was used.

SD rats (male, body weight=264.1 g to 317.2 g) were injected with heparin from the portal vein under anesthesia. Thereafter, they were perfused with a physiological saline solution (8 cmH₂O, about 100 mL) at room temperature, and then perfused with each organ perfusion solution (8 cmH₂O, about 100 mL) at room temperature. Thereafter, the liver was excised, immersed in 20 mL of each organ preserving solution, and preserved at 4° C. 1 day after and 2 days after the preservation was started, all liver samples were immobilized using a 10% phosphate buffer formalin aqueous solution, and embedded in paraffin according to the standard method. Each sample was sliced into about 6 μm and a hematoxylin-eosin staining sample was prepared, followed by microscopic examination. The degrees of the observed histopathological change were converted to scores as shown below, and summed as cumulative values. Tables 4 and 5 show the results.

Score 0: no change was observed, Score 0.5: slight change was observed, Score 1.0: small change was observed, Score 2.0: intermediate change was observed, Score 3.0: great change was observed.

TABLE 4

Effects of Combined Use of Quercetin and Sugar
(1 Day After Preservation at 4° C. Was Started)

| Concentration in Addition | | Histopathological Change (Cumulative Score of n = 3) | | |
|---|---|---|---|---|
| Quercetin | Sugar | Diffuse Vacuolar Degeneration | Sporadic Single Cell Cloudy Swelling | Sporadic Single Cell Necrosis |
| (1) — | — | 3.0 | 7.0 | 4.0 |
| (2) 10 µg/mL | — | 3.0 | 1.5 | 0.0 |
| (3) — | 0.2M Fructose | 2.0 | 2.5 | 1.0 |
| (4) — | 0.1M Sucrose | 3.0 | 2.0 | 0.5 |
| (5) 10 µg/mL | 0.2M Fructose | 0.0 | 0.0 | 0.0 |
| (6) 10 µg/mL | 0.1M Sucrose | 0.0 | 0.0 | 0.0 |

TABLE 5

Effects of Combined Use of Quercetin and Sugar
(2 Days After Preservation at 4° C. Was Started)

| Concentration in Addition | | Histopathological Change (Cumulative Score of n = 3) | | |
|---|---|---|---|---|
| Quercetin | Sugar | Diffuse Vacuolar Degeneration | Sporadic Single Cell Cloudy Swelling | Sporadic Single Cell Necrosis |
| (1) — | — | 3.0 | 8.0 | 5.0 |
| (2) 10 µg/mL | — | 3.0 | 2.0 | 0.5 |
| (3) — | 0.2M Fructose | 1.5 | 1.0 | 0.5 |
| (4) — | 0.1M Sucrose | 3.0 | 2.5 | 1.0 |
| (5) 10 µg/mL | 0.2M Fructose | 0.0 | 0.0 | 0.0 |
| (6) 10 µg/mL | 0.1M Sucrose | 0.0 | 0.0 | 0.0 |

Test Example 4: (Effects of Combined Use of Quercetin and Sugar in an Organ or Tissue Preservation Test, Rat Orthotopic Liver Transplantation)

The formulations of preserving solutions containing UW solution, and a combination of quercetin and sugar were evaluated using a rat orthotopic liver transplantation.

Williams solution only, and Williams solution containing quercetin (10 µg/mL) and sucrose (0.1M) were used as organ perfusion solutions. Subsequently, UW solution only, and UW solution containing quercetin (10 µg/mL) and sucrose (0.1M) were used as organ preserving solutions.

Donor SD rats (male, body weight=273.8 g to 335.7 g) were injected with heparin from the portal vein under anesthesia. Thereafter, they were perfused with a physiological saline solution (8 cmH$_2$O, about 100 mL) at room temperature, and then perfused with each organ perfusion solution (8 cmH$_2$O, about 100 mL) at room temperature. Thereafter, the liver was excised, immersed in 20 mL of each organ preserving solution, and preserved at 4° C. 1 day after the preservation was started, the livers were orthotopically transplanted to recipient rats. Two hours after the transplantation, the blood ALT was measured as an index of the degree of liver damage due to low-temperature preservation. The blood ALT is shown in Table 6 (average value of n=3±standard deviation). Further, all livers were simultaneously immobilized using a 10% phosphate buffer formalin aqueous solution, and embedded in paraffin according to the standard method. Each sample was sliced into about 6 µm, and a hematoxylin-eosin staining sample was prepared, followed by microscopic examination. The degrees of the observed histopathological change were converted to scores as shown below, and summed as cumulative values. Table 7 shows the results.

Score 0: no change was observed, Score 0.5: slight change was observed, Score 1.0: small change was observed, Score 2.0: intermediate change was observed, Score 3.0: great change was observed.

TABLE 6

Effects of Combined Use of Quercetin and Sugar (ALT in Rat Orthotopic Liver Transplantation Blood (IU/L))

| Preserving Agent | Blood ALT (IU/L) |
|---|---|
| (1)UW | 119 ± 13 |
| (2)UW + Quercetin 10 µg/mL + 0.1M Sucrose | 78 ± 8 |

TABLE 7

Hepatic Histopathological change (Cumulative Score of n = 3)

| Preserving Agent | Partial Bleeding | Partial Sinusoidal Endothelial Cell Degeneration | Sporadic Single Cell Necrosis |
|---|---|---|---|
| (1)UW | 4.0 | 3.0 | 3.0 |
| (2)UW + 10 µg/mL Quercetin + 0.1M Sucrose | 0.0 | 0.0 | 0.0 |

The invention claimed is:

1. A preserving solution for organ or tissue, comprising (A) quercetin; and (B) at least one sugar selected from the group consisting of fructose and sucrose, wherein the quercetin concentration is 1 to 100 µg/mL, and the sugar concentration is 0.025 to 0.4M.

2. The preserving solution according to claim 1, wherein the organ or tissue is heart, liver, kidney, pancreas, or pancreatic islet.

3. The preserving solution according to claim 1, further comprising at least one solvent selected from the group consisting of a physiological saline solution, an infusion solution, a buffer solution, a cell culture solution, an organ or tissue preserving solution, and a modena solution.

4. The preserving solution according to claim 3, further comprising at least one component selected from the group consisting of antibiotics, antibacterial agents, antioxidants, serums, sugars, lipids, vitamins, proteins, peptides, amino acids, pH indicators, chelating agents, and osmotic pressure regulators.

5. The preserving solution according to claim 1, wherein the quercetin concentration is 1 to 10 µg/mL.

6. A preservation method for organ or tissue, comprising immersing an organ or tissue in a liquid mixture comprising (A) quercetin and (B) at least one sugar selected from the group consisting of fructose and sucrose, wherein the quercetin concentration is 1 to 100 µg/mL, and the sugar concentration is 0.025 to 0.4M.

7. The method according to claim 6, wherein the organ or tissue is heart, liver, kidney, pancreas, or pancreatic islet.

8. The method according to claim 6, wherein the quercetin concentration is 1 to 10 µg/mL.

* * * * *